US008498981B2

(12) United States Patent
Petri et al.

(10) Patent No.: US 8,498,981 B2
(45) Date of Patent: Jul. 30, 2013

(54) SEARCH CAPABILITY IMPLEMENTATION FOR A DEVICE

(75) Inventors: Jonah Petri, Mountain View, CA (US); Jeremy Wyld, San Diego, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 12/400,763

(22) Filed: Mar. 9, 2009

(65) Prior Publication Data

US 2010/0228724 A1    Sep. 9, 2010

(51) Int. Cl.
*G06F 7/00* (2006.01)
*G06F 17/30* (2006.01)

(52) U.S. Cl.
USPC .......................................... 707/722; 707/769

(58) Field of Classification Search
USPC .................. 707/722, 769, 600, 705
See application file for complete search history.

(56) References Cited

U.S. PATENT DOCUMENTS

| | | | |
|---|---|---|---|
| 5,588,141 A | 12/1996 | Smith et al. | |
| 5,640,566 A | 6/1997 | Victor et al. | |
| 5,805,869 A | 9/1998 | Smith et al. | |
| 6,272,545 B1 * | 8/2001 | Flanagin et al. | 709/228 |
| 7,437,149 B1 * | 10/2008 | Papineau et al. | 455/418 |
| 7,599,916 B2 * | 10/2009 | Weare | 1/1 |
| 2005/0038775 A1 * | 2/2005 | Haveliwala et al. | 707/3 |
| 2007/0016570 A1 * | 1/2007 | Punaganti Venkata et al. | 707/4 |

OTHER PUBLICATIONS

"Soup (Apple Newton)" from Wikipedia, 1 page, accessed Apr. 15, 2009 at http://en.wikipedia.org/wiki/Soup_(Apple Newton). Best available copy.
"Newton (platform)" from Wikipedia, 6 pages, accessed Apr. 15, 2009 at http://en.wikipedia.org/wiki/Apple_Newton. Best available copy.
"Newton Manuals" Apple Inc., Article No. 50092, 2 pages, last modified Sep. 10, 2003, accessed Apr. 20, 2009 at http://docs.info.apple.com/article.html?artnum=50092. Best available copy.
Thompson, Bruce, "Sample Code: Desktop Connectivity" Apple Inc., 2 pages, accessed Apr. 20, 2009 at http://mirrors.unna.org/download.planetnewton.com/download/programming/sampcodeDC. Best available copy.
Smith, Walter R., "The Newton Application Architecture", Proceedings of the 39th IEEE Computer Society International Conference, 1994, IEEE, San Francisco, pp. 156-161. URL: http://www.unna.org/unna/apple/doeumentation/developer/Articles/. (6 pp.).
Culbert, Michael, "Low Power Hardware for a High Performance PDA", To appear in Proceedings of the 1994 Computer Conference, last updated Mar. 29, 2007, IEEE, San Francisco, (pp. 1-4). URL: http://www.unna.org/unna/apple/documentation/developer/Articles/.

(Continued)

Primary Examiner — Usmaan Saeed
Assistant Examiner — Paul Kim
(74) Attorney, Agent, or Firm — Blakely, Sokoloff, Taylor & Zafman LLP

(57) ABSTRACT

In a method of searching for data objects in a computer system, a content-based search of a first database generates a first domain-specific search result stream and a metadata-based search of a second database generates a second domain-specific search result stream. The first and second domain-specific search result streams are aggregated into a primary search result stream, and search results from the primary search result stream are displayed.

29 Claims, 6 Drawing Sheets

OTHER PUBLICATIONS

Welland, Robert, et al., "The Newton Operating System", To appear in Proceedings of the 1994 IEEE Computer Conference, last updated Mar. 29, 2007, IEEE, San Francisco, (pp. 1-8). URL: http://www.unna.org/unna/apple/documentation/developer/Articles/.

Newton Technical Publications Team, "Newton OS 2.1 Engineering Documents", Oct. 6, 1996, Apple Computer, Inc., Cupertino, CA, USA, (pp. 1-200). URL: http://www.unna.org/unna/apple/documentation/developer/.

Apple Computer, Inc., "Newton Formats Version 1.1", Newton Developer Tools, 1995, Apple Computer, Inc., Cupertino, CA, USA, (pp. 1-66). URL: http://www.unna.org/unna/apple/documentation/developer/NewtonFormats.1.pdf.

Apple Computer, Inc., "Newton Programmer's Guide for Newton 2.0", 1996, Addison-Wesley Publishing Company; Reading, MA, USA, (pp. 1-942). URL: http://www.unna.org/unna/apple/documentation/developer/ProgrammersGuideOS2.0.pdf.

Newton Technical Publications Team, "Newton Programmer's Guide: 2.1 OS Addendum", Apr. 22, 1997, Apple Computer, Inc., Cupertino, CA, USA, pp. 1-378. URL: http://www.unna.org/unna/apple/documentation/developer/ProgrammersGuideOS2.1Addenum.pdf. (388 pp.).

Apple Computer, Inc., "Newton 2.0 User Interface Guidelines", 1996, Addison-Wesley Publishing Company; Reading, MA, USA, (pp. 1-307). URL: http://unna.org/unna/apple/documentation/developer/UserInterfaceGuidelinesOS2.0.pdf.

Apple Computer, Inc., "Newton 2.0 User Interface Guidelines: Chapter 9, Draft 2", last updated Mar. 29, 2007, Apple Computer, Inc., Cupertino, CA, USA, (pp. 1-34). URL: http://www.unna.org/unna/apple/documentation/developer/UserInterfaceKeyboardOS2.1.pdf.

Apple Computer, Inc., "The NewtonScript Programming Language", 1996, Apple Computer, Inc., Cupertino, CA, USA, (pp. 1-284). URL: http://www.unna.org/unna/apple/documentation/developer/.

Smith, Walter R., "Using a Prototype-based Language for User Interface: The Newton Project's Experience", To appear in the Proceeding of the 1995 ACM Conference on Object-Oriented Programming Systems, Languages, and Applications, posted on Nov. 30, 2007, Association of Computing Machinery, Inc., (pp. 1-12). URL: http://waltersmith.us/wp-content/uploads/2005/12/OOPSLA95.pdf.

Apple Computer, Inc., Newton Solutions Guide, Issue 1, Apple Computer, Inc., Cupertino, CA, USA, (pp. 1-64). URL: http://www.newtonmuseum.com/goodies/Newton%20Solutions%20Guide%201pdf.

Apple Computer, Inc., Newton Solutions Guide, Issue 2, Apple Computer, Inc., Cupertino, CA, USA, (pp. 1-72). URL: http://www.newtonmuseum.com/goodies/Newton%20Solutions%20Guide%202.pdf.

Apple Computer, Inc., "Newton 2.x OS Q&A's", 1993-1997, (pp. 1-131). URL: http://www.unna.org/unna/apple/documentation/developer/QAs-2.x/acrobat/QAs_Newton_2.x.pdf.

Engber, Michael S., "Lost in Space, Draft 2", To be published in PIE Developers magazine, last updated Mar. 29, 2007, Michael S. Engber, (pp. 1-10). URL: http://www.unna.org/unna/apple/documentation/developer/Articies/.

Engber, Michael S., "More Soup? Draft 5", To be published in PIE Developers magazine, last updated Mar. 29, 2007, Michael S. Engber, (pp. 1-8). URL: http://unna.org/unna/apple/documentation/developer/Articies/.

Engber, Michael S., "Newton still needs the card you removed., Draft 5", To be published in PIE Developers magazine, last updated Mar. 29, 2007, Michael S. Engber, (pp. 1-14). URL: http://www.unna.org/unna/apple/documentation/developerlArticies/.

Engber, Michael S., "Tales From the View System", To be published in PIE Developers magazine, last updated Mar. 29, 2007, Michael S. Engber, (pp. 1-9). URL: http://www.unna.org/unna/apple/documentation/developer/Articies/.

Engber, Michael S., "Up in Alarms, Draft 2", To be published in PIE Developers magazine, last updated Mar. 29, 2007, Michael S. Engber, (pp. 1-7). URL: http://www.unna.org/unna/apple/documentation/developer/Articies/.

Engber, Michael S., "View Tips, Draft 3", To be published in PIE Developers magazine, last updated Mar. 29, 2007, Michael S. Engber, (pp. 1-4). URL: http://www.unna.org/unna/apple/documentation/developer/Articies/.

Smith, Walter R., "A Model of Address-Oriented Software and Hardware", Proceedings of the 25$^{th}$ Hawaii International Conference on System Sciences (HICSS-25), vol. I, 1992, IEEE, pp. 720-729. URL: http://waltersmith.us/wp-content/uploads/2005/12/HICSS-92.pdf. (10 pp.).

Apple Computer, Inc., "MessagePad 2000 User's Manual", 1997, Apple Computer, Inc., Cupertino, CA, USA, pp. 1-278. URL: http://www.unna.org/unna/apple/documentation/2x00/2000UsersManual.pdf. (291 pp.).

Apple Computer, Inc., "Apple MessagePad Handbook", 1996, Apple Computer, Inc., Cupertino, CA, USA, (pp. 1-396).

Apple Computer, Inc., "New Features of the Newton 2.0 Operating System", 1995, Apple Computer, Inc., Cupertino, CA, USA, (pp. 1-6).

Apple Computer, Inc., "Newton Technology Journal", Aug. 1995, vol. 1, No. 4, Apple Computer, Inc., Cupertino, CA, USA, (pp. 1-24). URL: http://www.unna.org/unna/apple/documentation/developer/NewtonTechnologyJournal/NTJ%201.04.pdf.

Apple Computer, Inc., "Newton Technology Jounal", Feb. 1995, vol. 1, No. 1, Apple Computer, Inc., Cupertino, CA, USA, (pp. 1-24). URL: http://www.unna.org/unna/apple/documentation/developer/NewtonTechnologyJournal/NTJ_1_01.pdf.

Apple Computer, Inc., "MessagePad 2100 User's Manual", 1997, Apple Computer, Inc., Cupertino, CA, USA, pp. 1-279. URL: http://www.unna.org/unna/apple/documentation/2x00/2100UsersManual.pdf. (292 pp.).

\* cited by examiner

SEARCH CAPABILITY IMPLEMENTATION FOR A DEVICE

TECHNICAL FIELD

This invention relates to the field of computing devices and, in particular, to searching of data in a computing device.

BACKGROUND OF THE INVENTION

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Numerous other types of files are capable of being created or modified, edited, and otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file.

Implementation of a find or search capability in a mobile computing device, such as a phone, personal digital assistant (PDA), laptop computer, or other device, may be constrained by limits on computing resources. For example, processing power, battery power, battery life, or other such computing resources may be limited in these devices. Since searching of files often consumes a significant amount of processing, performing a search in a computing device with limited resources can lead to such undesirable effects as a greatly decreased battery life or a high latency for performing the search. For example, significant searching activity on a handheld battery powered device can mean that a device which can operate for a day on a full battery charge if no searching is done will only operate for much less than a full day if searching is done.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
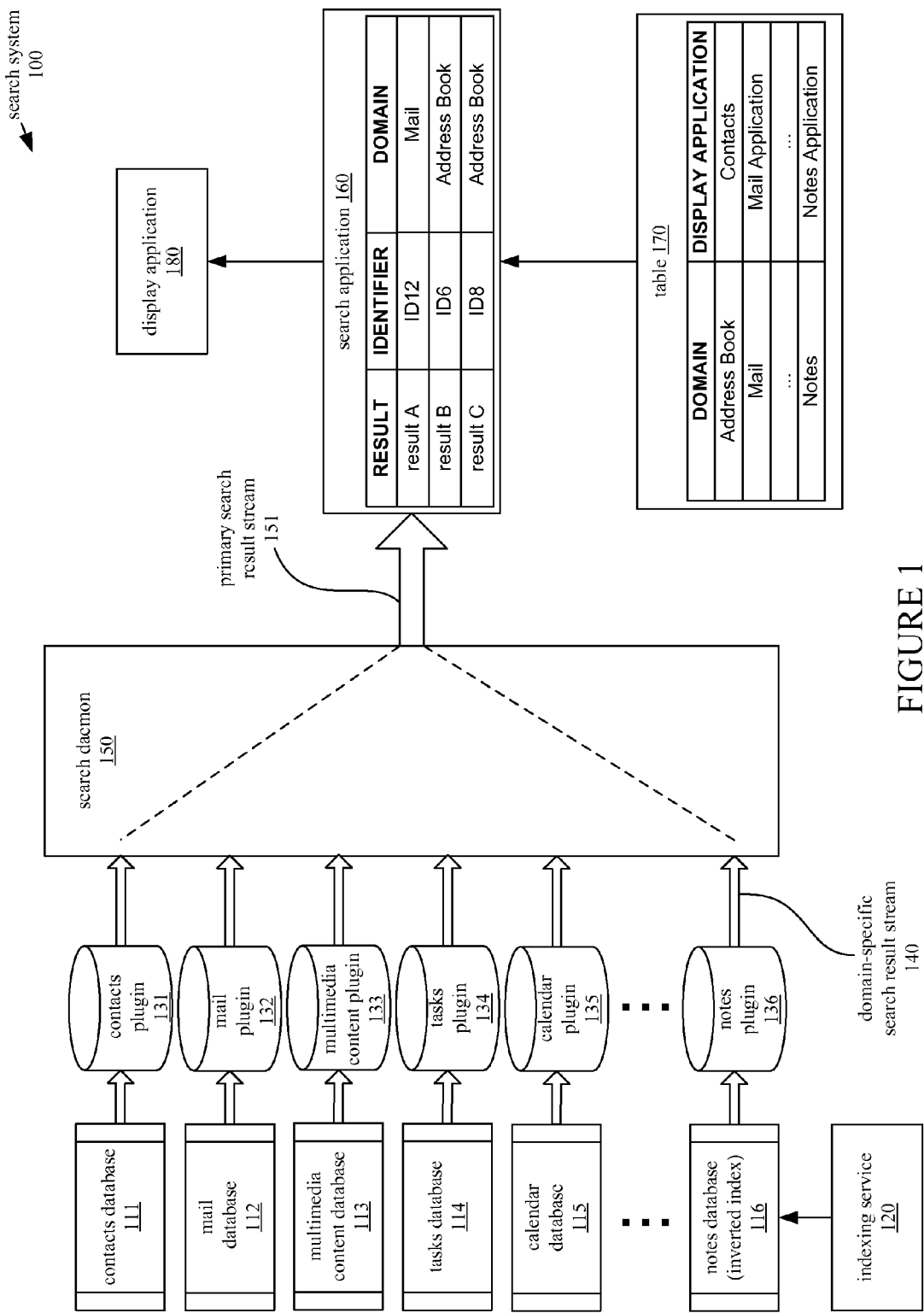
FIG. 1 illustrates a block diagram of a search system, according to one embodiment.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2009.

Generally, a search application may be implemented in a computing device to enable a user to locate data objects, such as files, according to search criteria entered by the user. For example, a user of a computer system wishing to locate objects matching certain criteria (i.e., having certain words in their file names, or having a certain modification date) may enter the desired criteria in the search application. The search application responds by finding files or other data objects matching the user's criteria and displaying these as a list of search results. In one embodiment, user can open the files or data objects directly from the list of search results displayed by the search application.

In one embodiment, different types of data objects may be grouped into search domains. For example, one domain may include email messages. Other domains may include such items as address book contacts, files, media, or other types of data objects. Each search domain is associated with a database that stores information about the objects in the domain. For example, a mail domain may include email messages and may be associated with a database that stores metadata about the email messages.

Some embodiments of a search application may harvest information from a number of such domain-specific databases to create a central database. When a user requests a search, the search application may match search terms entered by the user with the information in the central database. Thus, the search application effectively performs a search that includes all domains by using the central database. This method may result in reduced latency at search time because the central database can be optimized for efficient searching. However, compiling the central database is often implemented as a background process that consumes processing time and power even when the computing system is idle. Furthermore, when data objects are modified, the central database must be updated in addition to updating the database for the domain.

In one embodiment, the search application does not compile a central database, but instead invokes a search of each domain-specific database independently when the user performs a search. Each of these independent searches generates a domain-specific search result stream. These search result streams can then be aggregated to produce a primary search result stream. The search results from this primary search result stream are then displayed by the search application.

In one embodiment, the searches within each domain are directed towards content, or metadata, or may be directed to both content and metadata. In one embodiment, when a search is initiated by a user, the search application may invoke a search of content in one domain, but may invoke a search of metadata in another domain.

For example, one domain may include notes, such as those created with a note-taking application. For objects in the notes domain, a search may match search terms with content within the notes. Accordingly, a database for the notes domain may include an inverted index to facilitate searching of words within the content of the notes. Another domain may include picture objects. If the picture objects contain little searchable content, the database for the picture domain may include metadata describing the pictures, such as key words, filenames, modification dates, and the like. A single search operation may then search both of these domains using the same search criteria, performing a content-based search of notes in the notes domain, and performing a metadata-based search of pictures in the picture domain. The search result streams from each domain can then be aggregated into a primary search result stream, from which search results are displayed by the search application.

For some domains, the search application may invoke a search of both content and metadata. For example, a domain including email messages may be searched for content of the messages and metadata describing the messages.

Some search applications update domain-specific databases as a background process. However, in computer systems where processing resources are limited, running such a background process may consume processing time and other resources even when a computer system is idle, leading to effects such as decreased battery life.

Thus, in one embodiment of a search application, the domain-specific databases are updated at search time. When a search is initiated, the modification dates of the databases are compared with the latest modification dates of objects in the corresponding domain to determine whether the database is outdated. If the database is outdated, the database is updated to include information for the new objects in the domain. Similarly, the search process may create a database at search time upon determining that a database does not exist.

In one embodiment, the search application displaying search results responds to a selection of a search result by invoking an appropriate display application to display an object referenced by the search result. The search application determines the appropriate display application to invoke by checking a table that associates the domain of the search result with the application. The search application then invokes the display application and passes to the display application an identifier that identifies the object to the display application. In one embodiment, the identifier is recognized by both the search application and the display application to specify the same record in a particular domain. In one embodiment, the object referenced by the search result corresponds to a row in the domain-specific database, and the identifier is a row identifier for the object's row in the database, and a software component dedicated to searching that database specifies that row identifier to the display application to cause the display of that row or record.

FIG. 1 illustrates a block diagram of a system for searching in a computer device, according to one embodiment. Search system 100 includes a number of domain-specific databases 111, 112, 113, 114, 115, and 116 that are searchable by a number of domain-specific plugins 131, 132, 133, 134, 135, and 136, respectively, an indexing service 120, a search daemon 150, a search application 160, a table 170, and a display application 180. Search daemon 150 aggregates domain specific search result streams, including result stream 140, into a primary search result stream 151.

In a mobile computing device, such as a laptop computer or a phone, each processor cycle that is used consumes power and may decrease the battery life. Thus, in one embodiment, a search application minimizes power usage by searching domain-specific databases 111, 112, 113, 114, 115, and 116 independently and aggregating the search results at search time, rather than compiling and searching a single central database. This avoids the use of processing cycles for maintaining the central database. Where updating the central database occurs as a periodic background process, the resulting power consumption may significantly decrease battery life in a mobile device.

In one embodiment, the domain specific databases 111, 112, 113, 114, 115, and 116 are each associated with a domain. For example, the contacts database 111 is associated with a contacts domain. Each domain includes a number of data objects, such as files, media content, email messages, task items, address book contacts, or the like. For example, the contacts domain may include a set of address book contacts stored on a mobile device. Likewise, a mail domain may include the set of email messages in a user's inbox on the mobile device. In one embodiment, a domain may include a mixture of different types of data objects. For example, a multimedia domain could include audio, video, and picture files.

The domain specific databases that may include content, metadata, or both content and metadata related to objects in the associated domain. For example, a mail domain that includes email messages may be associated with a mail database 112 that includes metadata about the email messages included in the mail domain. The metadata stored in mail database 112 may include such information as the sender, subject, date of receipt, flags, or other information about the email messages.

In one embodiment, each database has one row corresponding to each of the objects in the associated domain. For example, the mail database 112 may have one row for each email message in the mail domain. Each row in the database stores the metadata for the data object associated with that row, and is identified by a 64-bit identifier that is unique within the database. In one embodiment, the database includes a row for each object in the domain so that each object can be uniquely identified within its domain by the 64-bit row identifier.

In one embodiment, a domain specific database may include an index of the content within the objects in the domain or a separate inverted index may be maintained for the database. For example, the notes database 116 may include an index of note content. In one embodiment, a notes application allows a user to save text in data objects called notes, and the saved text is the content that is indexed by the notes database 116. In one embodiment, the index in notes database 116 is an inverted index, which lists possible search terms with the locations in the data objects where the terms can be found. An inverted index is a form of an index data structure which is known in the art and is used to perform full text searching of content.

Other types of content that may be indexed include the bodies or subject lines of email messages, text within text documents, web page content, and the like.

In one embodiment where an index is included in or associated with a domain-specific database, the index may be updated at search time, rather than as content is created or changed. For example, a search system 100 may determine at search time whether an index to be used to perform the requested search is outdated. One way to make this determination is to compare a time stamp (such as a last modified date) of the index with the latest time stamp of all the data objects in the corresponding domain. If a data object exists that is newer than the index, or a data object has been modified after the last update of the index, the index may be considered outdated when the search is requested.

If the index is outdated, the search system 100 may update the index before performing the search. In one embodiment, the updating only includes content that has been created since the index was last updated. In one embodiment, the search system 100 may also determine whether an index exists, and may create an index at search time if the index does not exist.

By updating an existing index, or creating an updated index at search time, the search process is more likely to return up-to-date search results. This approach decreases the likelihood that newly modified or created data objects in the domain that match the search criteria will not be found because they are not included in an outdated index. In one embodiment, the updating or creating process is performed by an indexing service 120.

For example, the notes database 116 may include an inverted index that maps a number of keywords to the location of those keywords in the notes domain. In response to a search initiated by a user, the indexing service 120 determines whether the inverted index in the notes database 116 is outdated by comparing a modification date of the notes database 116 with the latest modification date among the data objects (i.e., notes) in the notes domain. If the indexing service determines that the index does not exist or is outdated, the indexing service updates or creates the index accordingly.

In one embodiment, the domain-specific databases in search system 100 includes are used to search either content only, metadata only, or both content and metadata of objects in their corresponding domains.

For some types of data objects, a content-based search is not always appropriate. For example, a pictures domain that includes picture files, such as bitmap or JPEG files may be searched for only metadata because the picture files in the domain do not contain content that is readily searchable by search terms that can be entered by a user. Accordingly, the domain-specific database may contain only metadata about the picture files in the domain.

Other types of data objects, such as notes or text files, may be readily searched for content. For example, in the case of notes, each note contains text that is readily searchable according to search terms that can be entered by a user.

Some data objects that are readily searched for content, such as email messages, can also be searched for metadata. In one embodiment, domains containing such data objects that can be searched for both content and metadata have a corresponding domain-specific database that includes both metadata and an index of content. For example, a mail domain that includes email messages may correspond to a mail database 112, where the mail database 112 includes metadata for each email message (such as sender, subject line, etc.) as well as an index of content (i.e., the text of the email message body).

Thus, in one embodiment, the search system 100 searches either content, or metadata, or both content and metadata within a domain depending on whether content and/or metadata is included in the associated domain-specific database. For example, a user may initiate a search query by entering a search term. The search system 100 responds to the query by searching for the search term in the databases 111, 112, 113, 114, 115, and 116. With respect to the databases 116, 113, and 112, the search is directed towards note content (using the notes database 116), metadata of multimedia files (using multimedia database 113), and content and metadata of email messages (using the mail database 112).

The search system 100 includes, in one embodiment, a number of plugins 131, 132, 133, 134, 135, and 136 associated with databases 111, 112, 113, 114, 115, and 116, respectively. Each of these plugins 131, 132, 133, 134, 135, and 136 are configured to perform searches of their associated databases to generate a domain-specific search result stream.

For example, when a user inputs search terms and initiates a search query, each plugin responds by searching its associated database. The notes database 116, for example, is searched by the notes plugin 136. The notes plugin 136 may perform the search by matching the search terms with information in the notes database 116. The plugin 136 generates a domain-specific search result stream 140 that includes the search results from searching the notes database 116. Each of the search results in the domain-specific search result stream references a data object that matches the search terms.

A domain-specific search result stream may include a number of search results, each search result referencing a data object in the corresponding domain that matches the criteria of the search query. In addition, the search results may include the domain of the data object, as well as an identifier that uniquely identifies the data object within the domain. In one embodiment, the identifier is not necessarily globally unique (i.e., unique relative to other domains).

Each of the plugins 131, 132, 133, 134, 135, and 136 passes its domain-specific search result stream, such as result stream 140, to the search daemon 150. Search daemon 150 generates a primary search result stream 151 by aggregating the domain-specific search result streams.

In one embodiment, the domain-specific search result streams include a number of search results that may be transmitted while the search is being performed. For example, the notes plugin 136 may transmit search results representing notes matching the search criteria as they are found, rather than transmitting the search results after the search is completed.

Similarly, the primary search result stream may include a number of search results transmitted to the search application 160 over time. For example, the search daemon may aggregate search results received from the plugins and transmit the search results to the search application in the primary search result stream 151 while the search is being performed. Thus, in one embodiment, the search application 160 displays a list of search results that constantly updates as the search results are found.

In one embodiment, the search application 160 displays the search results in a graphical user interface (GUI) on the screen of a portable electronic device or other computer. The GUI provides a way for the user to select a search result for opening. In one embodiment, a user can click or double-click (i.e., using a mouse or finger tap) on the search result in the GUI to open the object represented by the search result. For example, the search application 160 displays the following search results: "result A", "result B", and "result C". The search results correspond to identifiers "ID12", "ID6", and "ID8", and are from the domains "Mail", "Address Book", and "Address Book", respectively. In one embodiment, this information is received from the primary search result stream 151.

When the search application 160 receives a request to open one of the search result objects (such as a click or double click on the corresponding search result in the GUI), the search application responds by identifying a display application 180 to invoke for displaying the selected search result object.

The search application 160 looks up the appropriate display application 180 based on the domain in which the selected search result was found. For example, when the search application 160 receives a request to open the object associated with "result B", the search application 160 determines that "result B" is associated with the "Address Book" domain. The search application 160 looks up the "Address Book" domain in table 170 to identify the display application associated with the "Address Book" domain. Since table 170 identifies the "Contacts" application as being associated with the "Address Book" domain, the search application 160 invokes the "Contacts" application to display the data object referenced by search result "result B". Thus, according to this example, the display application 180 is the "Contacts" application.

In addition to invoking the display application 180, the search application also identifies the data object to the display application 180 using an identifier. For example, if "result B" is selected for display, the search application 160 determines that the corresponding identifier for "result B" is "ID6" and passes the identifier "ID6" to the display application 180.

The display application 180 receives the identifier "ID6" and uses it to identify the data object referenced by search result "result B". In one embodiment, the identifier is provided by the domain plugin for the domain of the referenced object. For example, the identifier "ID12" for the search result "result A" may be assigned by the domain plugin for the "Mail" domain, which is the mail plugin 132.

In one embodiment, the identifiers for some or all of the search results are row identifiers in the domain-specific databases. For example, a domain-specific database may include a 64-bit identifier that uniquely identifies each row, and each row may correspond to a data object in the corresponding domain. At search time, if the data object matches the search query, the row identifier of the data object is passed to the search application 160 through a domain-specific search result stream and the primary search result stream 151.

In an alternative embodiment, the identifier may be a uniform resource locator (URL). In cases where a URL is used to identify the objects, the URL may be processed by a URL handling process of an operating system running on the portable device or computer system. In one embodiment where a URL is used as the identifier, the identifier is passed to the URL handling process of the operating system, which invokes the appropriate application for viewing the object referenced by the URL.

In one embodiment, the display application 180 is invoked by the search application 160 and also receives the identifier from the search application 160. In one embodiment where a row identifier of the domain database is used as the identifier, the display application 180 looks up the data object to be displayed in the domain database, using the identifier. Alternatively, the identifier may be another string or symbolic name, such as a path to the object in a file system, that can be processed by the display application 180 to identify the object to be opened.

One embodiment of a computing device in which a search system may be implemented may also include a data port for connecting one or more peripheral devices. The data port may include a physical or wireless connection protocol, such as USB, Firewire, or IEEE 802.11 to connect the computing device to a peripheral device.

In one embodiment, a search domain may be active or inactive depending on whether a particular peripheral device is connected to the computing device. For example, one type of peripheral device may be an external hard disk drive (HDD), which may be associated with an external HDD domain that is only active when the external HDD is connected to the computing device. For example, the external HDD domain may include data objects such as files that are searched only when the external HDD is connected to the computing device.

When the peripheral device is connected and the associated domain is active, the domain is searched in a similar manner as other domains, as-previously described. When the peripheral device is disconnected, the domain is inactive and is not searched.

In one embodiment, the computing device includes detection logic to determine whether a peripheral device is connected, and to activate or deactivate a domain in response to detecting that the peripheral device is connected or disconnected, respectively.

A search system such as search system 100 may be implemented in a variety of computing systems, such as laptop or desktop computers, server systems, and the like. In addition, the search system may also be implemented in a mobile or portable computing device.

Figure 2A:
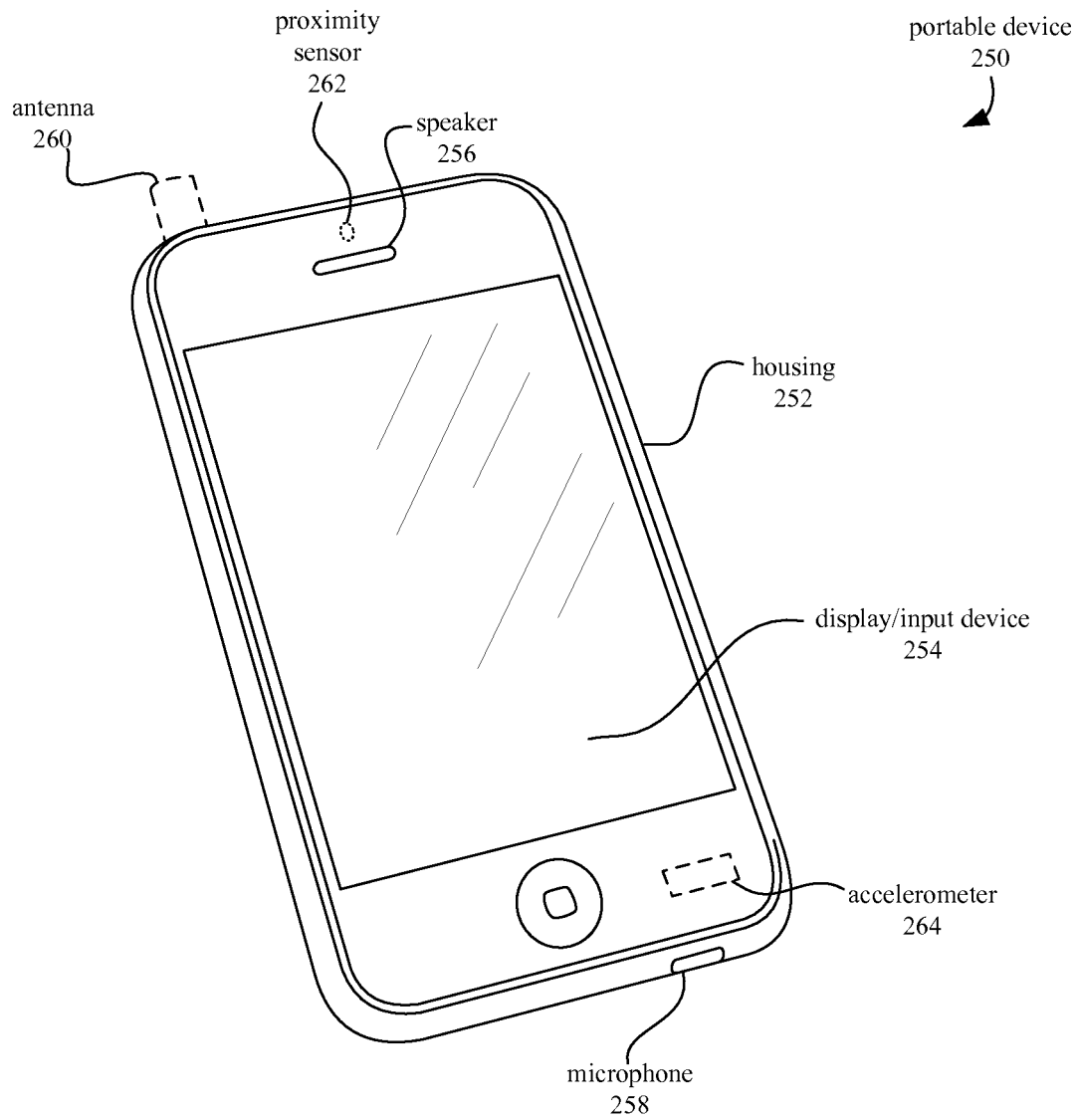
FIG. 2A illustrates a perspective view of one embodiment of a portable device.

FIG. 2A shows a portable device 250 in which a search application may be implemented, according to one embodiment. The portable device 250 may include a housing 252, a display/input device 254, a speaker 256, a microphone 258 and an optional antenna 260 (which may be visible on the exterior of the housing or may be concealed within the housing). The portable device 250 also may include a proximity sensor 262 and an accelerometer 264. The portable device 250 may be a cellular telephone or a device which is an integrated PDA and a cellular telephone or a device which is an integrated media player and a cellular telephone or a device which is both an entertainment system (e.g. for playing games) and a cellular telephone, or the portable device 250 may be other types of devices described herein. In one particular embodiment, the portable device 250 may include a cellular telephone and a media player and a PDA, all contained within the housing 252. The portable device 250 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 254 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches. A multi-point input touch screen may also be referred to as a multi-touch input panel.

A processing device (not shown) may be coupled to the display/input device 254. The processing device may be used to calculate touches on the touch panel. The display/input device 254 can use the detected touch (e.g., blob or blobs from a user's face) data to, for example, identify the location of certain objects and to also identify the type of object touching (or nearly touching) the display/input device 254.

The data acquired from the proximity sensor 262 and the display/input device 254 can be combined to gather information about the user's activities as described herein. The data from the proximity sensor 262 and the display/input device 254 can be used to change one or more settings of the portable device 250, such as, for example, change an illumination setting of the display/input device 254.

Figure 4:
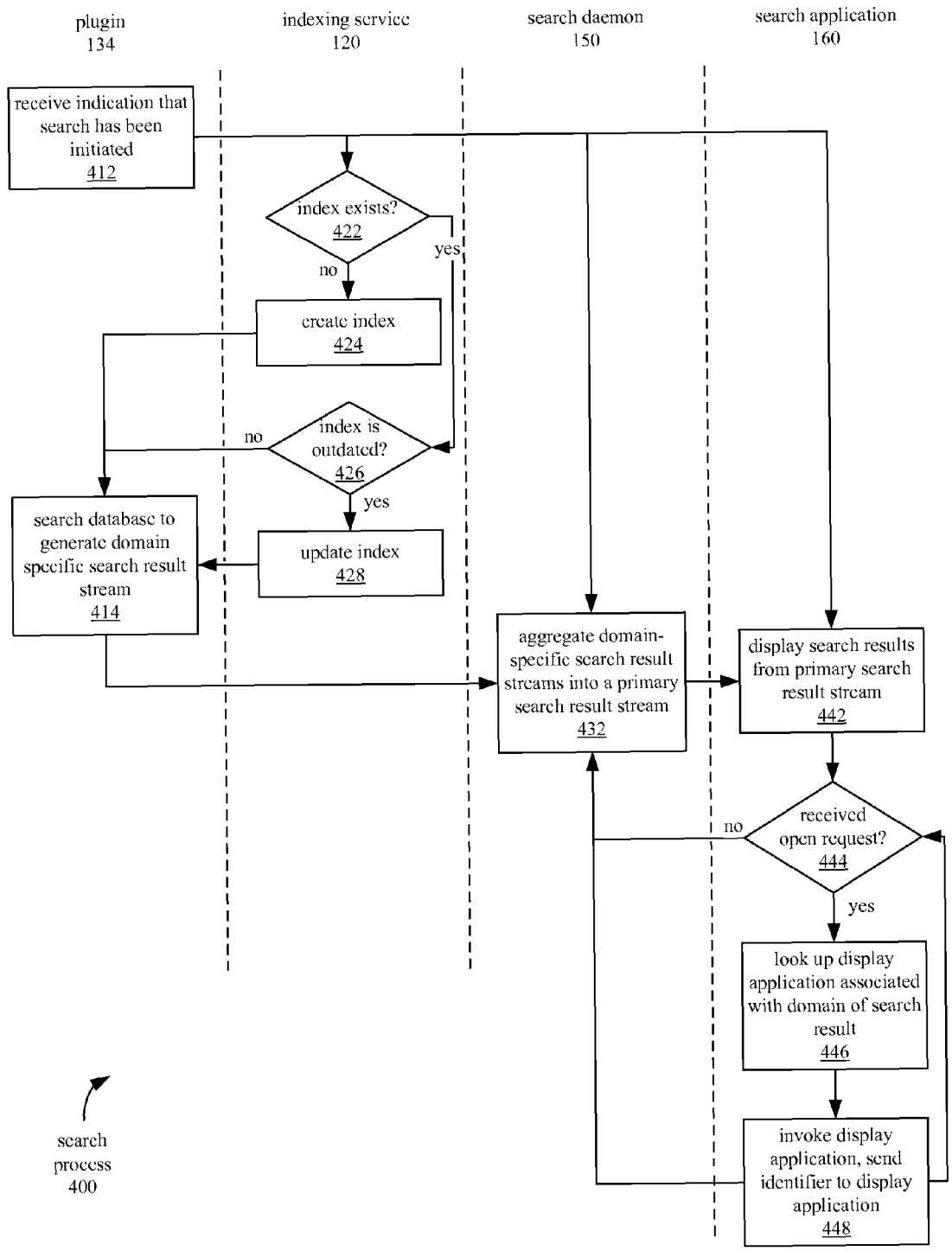
FIG. 4 is a flow diagram illustrating a process for performing a search in a computing device, according to one embodiment.

In one embodiment, as shown in FIG. 4, the display/input device 254 occupies a large portion of one surface (e.g. the top surface) of the housing 252 of the portable computing device 250. In one embodiment, the display/input device 254 consumes substantially the entire front surface of the computing device 250. In another embodiment, the display/input device 254 consumes, for example, at least 75% of a front surface of the housing 252 of the computing device 250. In alternative embodiments, the portable device 250 may include a display which does not have input capabilities, but the display still occupies a large portion of one surface of the portable device 250. In this case, the portable device 250 may include other types of input devices such as a QWERTY keyboard or other types of keyboard which slide out or swing out from a portion of the portable device 250.

Figure 2B:
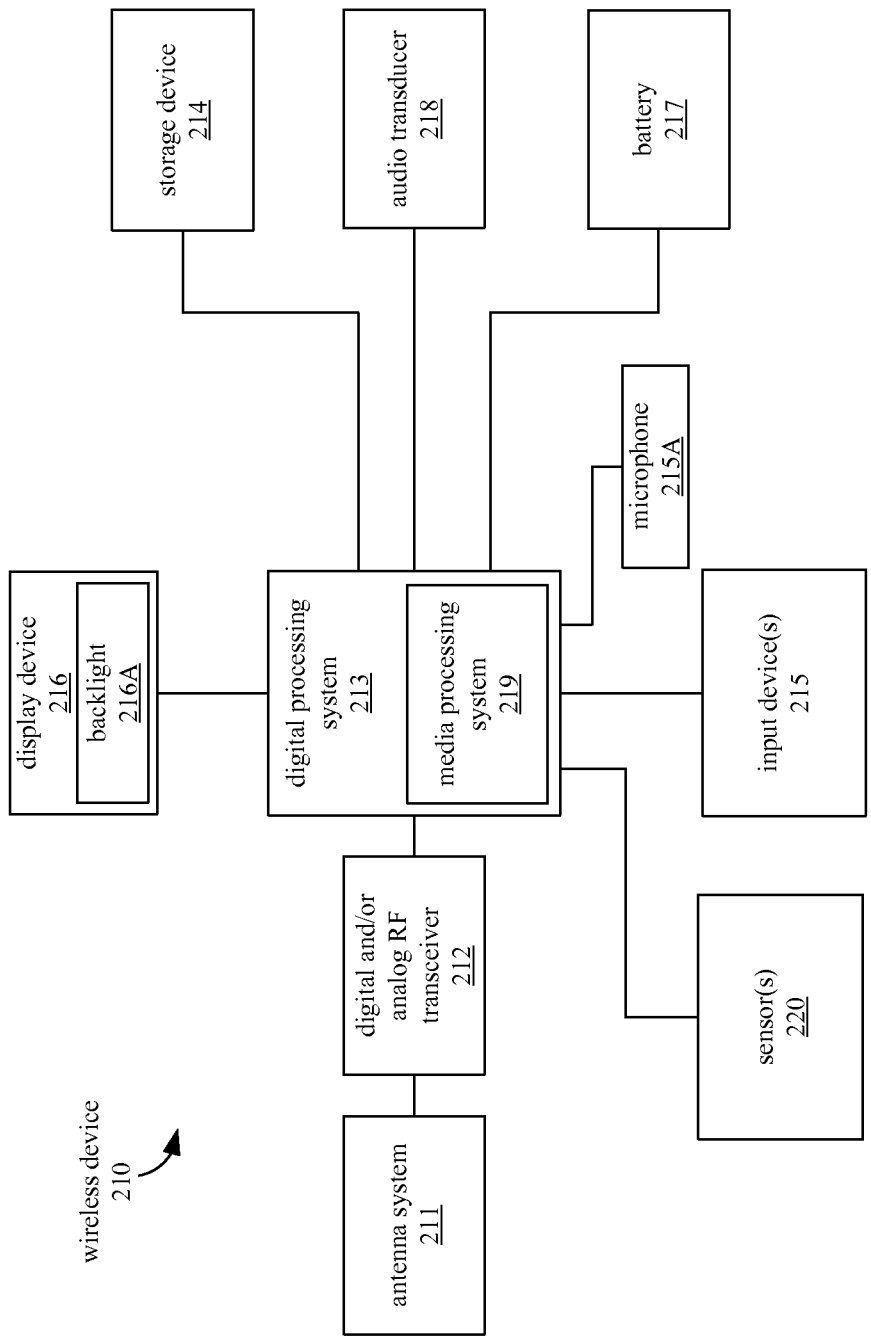
FIG. 2B illustrates a block diagram of a wireless device, according to one embodiment.

The portable device 250 may be a wireless communication device, such as a cellular telephone, and may include a plurality of components which provide a capability for wireless communication. FIG. 2B shows an embodiment of a wireless device 210 which includes the capability for wireless communication. The wireless device 210 may be included in portable device 250, although alternative embodiments of portable device 250 may include more or fewer components than the wireless device 100.

Wireless device 210 may include an antenna system 211. Wireless device 210 may also include a digital and/or analog radio frequency (RF) transceiver 212, coupled to the antenna system 211, to transmit and/or receive voice, digital data and/or media signals through antenna system 211.

Wireless device 210 may also include a digital processing system 213 to control the digital RF transceiver and to manage the voice, digital data and/or media signals. Digital processing system 213 may be a general purpose processing device, such as a microprocessor or controller for example. Digital processing system 213 may also be a special purpose processing device, such as an ASIC (application specific integrated circuit), FPGA (field-programmable gate array) or DSP (digital signal processor). Digital processing system 213 may also include other devices, as are known in the art, to interface with other components of wireless device 210. For example, digital processing system 213 may include analog-to-digital and digital-to-analog converters to interface with other components of wireless device 210. Digital processing system 213 may include a media processing system 219, which may also include a general purpose or special purpose processing device to manage media, such as files of audio data.

Wireless device 210 may also include a storage device 214, coupled to the digital processing system, to store data and/or operating programs for the wireless device 210. Storage device 214 may be, for example, any type of solid-state or magnetic memory device.

Wireless device 210 may also include one or more input devices 215, coupled to the digital processing system 213, to accept user inputs (e.g., telephone numbers, names, addresses, media selections, etc.) Input device 215 may be, for example, one or more of a keypad, a touchpad, a touch screen, a pointing device in combination with a display device or similar input device.

Wireless device 210 may also include at least one display device 216, coupled to the digital processing system 213, to display information such as messages, telephone call information, contact information, pictures, movies and/or titles or other indicators of media being selected via the input device 215. Display device 216 may be, for example, an LCD display device. In one embodiment, display device 216 and input device 105 may be integrated together in the same device (e.g., a touch screen LCD such as a multi-touch input panel which is integrated with a display device, such as an LCD display device). The display device 216 may include a backlight 216A to illuminate the display device 216 under certain circumstances. It will be appreciated that the wireless device 210 may include multiple displays.

Wireless device 210 may also include a battery 217 to supply operating power to components of the system including digital RF transceiver 212, digital processing system 213, storage device 214, input device 215, microphone 215A, audio transducer 218, media processing system 219, sensor(s) 220, and display device 216. Battery 217 may be, for example, a rechargeable or non-rechargeable lithium or nickel metal hydride battery.

Wireless device 210 may also include audio transducers 218, which may include one or more speakers, and at least one microphone 215A.

Wireless device 210 may also include one or more sensors 220 coupled to the digital processing system 213. The sensor(s) 220 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 220, various responses may be performed automatically by the digital processing system, such as, for example, activating or deactivating the backlight 216A, changing a setting of the input device 215 (e.g. switching between processing or not processing, as an intentional user input, any input data from an input device), and other responses and combinations thereof.

In one embodiment, digital RF transceiver 212, digital processing system 213 and/or storage device 214 may include one or more integrated circuits disposed on a printed circuit board (PCB).

Figure 3:
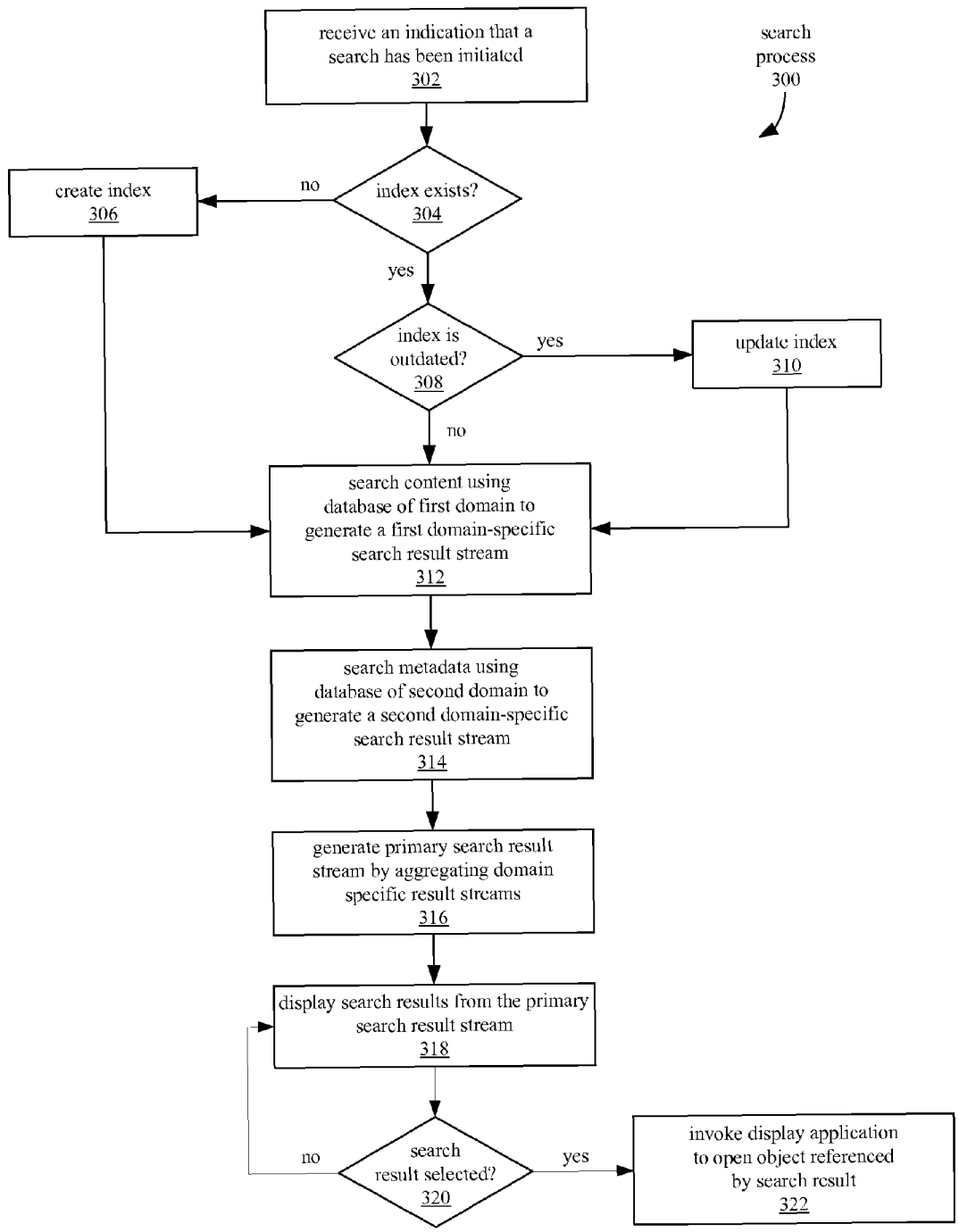
FIG. 3 is a flow diagram illustrating a process for performing a search in a computing device, according to one embodiment.

FIG. 3 is a flow diagram illustrating one embodiment of a process for performing a search in a computing device. Search process 300 may be performed by a search system such as search system 100, illustrated in FIG. 1.

At block 302 of search process 300, the search system receives an indication that a search has been initiated. In one embodiment, such an indication may be received by a search application, such as search application 160. Search application 160 may provide a GUI that allows a user to perform a search by entering search terms and other search criteria. Search application 160 receives an input from the user, such as a mouse click or keystroke, indicating that the user wishes to perform the search. In response to this input, the search application 160 may send an indication that the search has been initiated to other components in the search system 100.

At block 304, the search system, in response to receiving the indication that the search has been initiated, determines whether an index of the content to be searched already exists. In particular, the operations corresponding to block 304 may be performed by an indexing service, such as indexing service 120. Indexing service 120 may determine if the index exists by attempting to read or locate the index. In one embodiment, the search system includes a number of domain databases, such as databases 111, 112, 113, etc., that include a number of indexes to be searched. Accordingly, indexing service 120 may check for the existence of more than one index. In one embodiment, the indexing service checks for an index associated with each domain-specific database for which content is to be searched. If the indexing service determines that the index or indexes do not exist, the process 300 proceeds to block 306.

At block 306, the indexing service 120 creates an index of the content to be searched in response to determining that the index does not already exist. In one embodiment, the indexing service 120 creates an index for each domain database for which a content based search is to be performed. From block 306, the process 300 continues at block 312.

If, at block 304, the search process 300 determines that the index exists, the process 300 continues at block 308. At block 308, the indexing service 120 determines whether the index is outdated. In one embodiment, the indexing service 120 compares a timestamp of the index, indicating the last modification time of the index, with the latest modification time of any object in the corresponding domain. If any object in the domain has been modified since the latest update of the index, the indexing service 120 determines that the index is outdated. If the index is outdated, the process 300 continues at block 310.

At block 310, indexing service 120 updates the index. In one embodiment, the indexing service 120 updates the index by identifying the data objects in the domain that have changed since the latest update of the index. The indexing service 120 adds index information for the changed data objects to the index. In one embodiment, the index is an inverted index so that the indexing service updates the index by adding information that maps content to the locations of the content in the changed data objects. From block 310, the process 300 continues at block 312.

If, at block 308, the index is not outdated, the process 300 continues at block 312. At block 312, a domain plugin associated with a domain in which a content-based search is to be performed performs a search of that content using a database associated with that domain. The domain plugin thus generates a first domain-specific search result stream. For example, the notes database 116 corresponds to a domain in which a content-based search is to be performed. The notes plugin 136 performs a content based search using the notes database 116, which includes an inverted index. For example, the plugin 136 may look up the search terms entered by the user in the inverted index to identify data objects (i.e., notes) in the notes domain that match the search terms, as well as the locations of the search terms in those data objects.

In one embodiment, the data objects matching the search terms are included in the search results that are sent to the search daemon 150 through the domain-specific search result stream 140.

At block 314, domain plugin in search system 100 performs a search of metadata using a database of a second domain to generate a second domain-specific search result stream. For example, the tasks plugin 134 may search the tasks database 114, which contains metadata describing data objects (i.e., tasks) in the tasks domain. The tasks plugin 134 may search the metadata in the database 114 by matching the search terms with the metadata to identify data objects that have metadata matching the search terms. The matching data objects are identified in the search results sent to the search daemon 150 in a domain-specific search result stream. In one embodiment, the metadata-based search of block 314 is initiated in response to the same search query as the content-based search of block 312.

In one embodiment, the domain-specific search result streams generated by domain plugins, such as notes plugin 136 and tasks plugin 134, include search results that are data structures containing references to data objects that match the search terms. In one embodiment where a domain database includes row identifiers corresponding to the data objects, the row identifier of a matching data object is included in a search result. Alternatively, another symbol or name can be used to identify the matching data object, such as a URL or a file system path. The search results may also include other information about the matching data object, such as the domain in which the object was found, the metadata or content that matched the search terms, the location of content matching the search terms, or other information describing the matching data object.

At block 316, the search process 300 generates a primary search result stream 151 by aggregating the domain specific search result streams generated at blocks 312 and 314. The primary result stream 151 may also include search results from a number of other domain-specific search result streams generated by plugins 131, 132, 133, etc.

At block 318, the search application 160 displays one or more search results from the primary search result stream 151. For example, the search application 160 may list the search results from the primary search results stream 151 in a GUI displayed on a screen of the computing device.

At block 320, the search process 300 determines whether one of the search results displayed at block 318 has been selected, indicating that an object referenced by the search result is requested to be opened. For example, the search application 160 may detect a mouse click or finger tap on the GUI that lists the search results, or a keystroke, or some input that identifies one of the displayed search results.

At block 322, in response to determining that one of the search results has been thus selected for opening, the search process 300 invokes a display application to open an object referenced by the search result. For example, if search application 160 detects a mouse click or finger tap on "result A", the search application 160 looks up the appropriate application with which to open the data object referenced by "result A" in table 170. Search application 160 matches the domain of "result A", which is the "Mail" domain, with the domains listed in table 170 to determine that the appropriate application for opening the "result A" data object is the "Mail Application".

Search application 160 invokes the display application 180, which in the above example is the "Mail Application", and sends the display application 180 an identifier corresponding to "result A". In this example, the identifier is "ID12". The display application uses the identifier to locate the data object for opening.

In one embodiment, the identifier of the data object is a row identifier from the data object's domain database. Accordingly, the display application 180 can identify the data object by matching the identifier in the domain database. Having identified the appropriate object to open, the display application 180 opens the object.

FIG. 4 is a flow diagram illustrating one embodiment of a search process that can be performed in a computing device.

The search process 400 may be implemented by a search system, such as search system 100, illustrated in FIG. 1. The search process 400 includes operations performed by a plugin, such as plugin 134, and indexing service, such as indexing service 120, a search daemon, such as search daemon 150, and a search application, such as search application 160.

At block 412, the plugin 134 receives an indication that a search has been initiated. In response to receiving the indication that the search has been initiated, the plugin 134 may initiate operations performed by the indexing service 120 at block 422, the search daemon 150 at block 432, and the search application 160 at block 442.

At block 422, in response to the plugin 134 receiving the indication that the search has been initiated, the indexing service 120 determines whether an index of the content to be searched already exists. If the index does not exist, the process 400 proceeds to block 424.

At block 424, the indexing service 120 creates an index of the content to be searched in response to determining that the index does not already exist. From block 424, the process 400 continues at block 414.

If, at block 422, the indexing service 120 determines that the index already exists, the process 400 continues at block 426. At block 426, the indexing service 120 determines whether the index is outdated. If the index is outdated, the process 400 continues at block 428.

At block 428, the indexing service 120 updates the index. From block 428, the process 300 continues at block 414.

In one embodiment, the operations corresponding to blocks 422, 424, 426, and 428 correspond to the operations performed at blocks 304, 306, 308, and 310, respectively.

If, at block 426, the index is not outdated, the process 400 continues at block 414. At block 414, a domain plugin searches a domain-specific database to generate a domain-specific search result stream. For example, the notes plugin 136 may perform a search of notes database 116 to generate domain-specific search result stream 140.

At block 432, the search daemon 150 aggregates the domain-specific search result stream generated at block 414 with at least one other domain-specific search result stream to generate a primary search result stream. In one embodiment, the other domain-specific search result streams are generated by plugins associated with other domains, such as the contacts plugin 131 or the mail plugin 132.

At block 442, the search application 160 displays search results from the primary search result stream. For example, the search application may list search results from the primary search result stream 151 in a GUI on a display of a computing device. The search application 160 may also be configured to detect inputs on the GUI, such as a mouse click, finger tap, keystroke, or other input that identifies one of the listed search results.

At block 444, the search application determines whether an open request, which is a request to open an object corresponding to one of the displayed search results, has been received. For example, the search application 160 may receive an input, such as a mouse click or finger tap, on one of the search results listed in the GUI, and may interpret the input as an open request to open a data object corresponding to the search result.

If an open request has been received, the process 400 continues at block 446. At block 446, the search application 160 looks up a display application that is associated with the domain of the search result selected for opening. For example, the display application may look up the domain of the search result in table 170, as previously described.

At block 448, the search application invokes the display application and identifies the object to be opened by sending an identifier to the display application. As previously discussed with reference to search process 300, the identifier may be a row identifier of a domain database from which the search result originated, or may be some other identifier, such as a URL or a file system path. The display application uses the identifier to identify the data object to be opened and opens the data object.

If, at block 444, an open request has not been received, the process continues back to block 432, where the search daemon 150 continues to aggregate the domain-specific search result streams into a primary search result stream.

Figure 5:
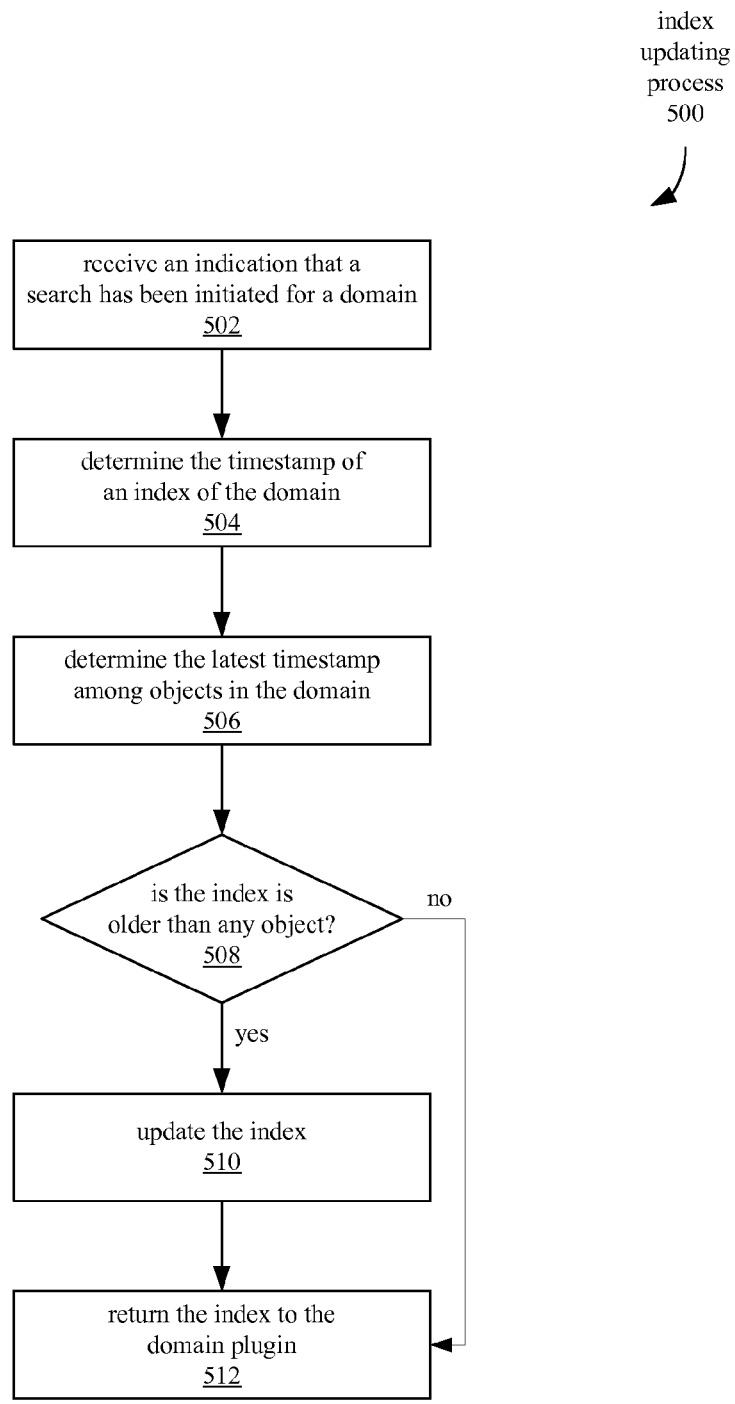
FIG. 5 is a flow diagram illustrating a process for updating an index incident to a search in a computing device, according to one embodiment.

FIG. 5 is a flow diagram illustrating one embodiment of a process of updating an index. In one embodiment, the operations represented by index updating process 500 correspond to the operations of blocks 302, 308, and 310 of search process 300, or blocks 412, 426, and 428 of search process 400. The operations of index updating process 500 may be performed by an indexing service, such as indexing service 120.

At block 502, the indexing service 120 receives an indication that a search has been initiated. The index updating process may be initiated by a search application, such as search application 160.

In one embodiment, metadata associated with an index includes a timestamp that records the last time at which the index was updated. Similarly, each data object in a domain may have a timestamp indicating the last time at which the data object was modified. Thus, at block 504, the indexing service 120 determines a timestamp of an index of the domain. At block 506, the indexing service 120 determines the latest timestamp among the objects in the domain.

At block 508, the indexing service determines whether the index is older than any of the objects in the domain by comparing the timestamp of the index and the latest timestamp among the data objects in the domain. If the timestamp of the index the index is older than at least one of the timestamps of the objects in the domain, the index is outdated and the process 500 continues at block 510.

At block 510, the indexing service updates the index in response to determining that the index is older than at least one of the objects in the domain. In one embodiment, the operations performed at block 510 are similar to the operations of blocks 310 or 428 of search processes 300 and 400, respectively.

If, at block 508, the indexing service 120 determines that the index is not older than any object in the domain, execution proceeds to block 512. At block 512, since the index is up to date, the indexing service returns the index to the domain plugin.

Embodiments of the present invention thus enable searching of data objects in a computing device. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Moreover, the description of FIGS. 2A and 2B is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIGS. 3 and 5 without departing from the scope of the invention and that no particular order is implied by the arrangement of blocks shown and described herein.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Therefore, it is manifestly intended that this invention be limited only by the following claims and equivalents thereof.

What is claimed is:

1. An apparatus, comprising:
    a processor in a computing device;
    a search daemon implemented by the processor, wherein the search daemon is configured to, in response to receiving an indication that a search has been initiated, aggregate a plurality of domain-specific search result streams including a first search result stream and a second search result stream to generate a primary search result stream, wherein the plurality of domain-specific search result streams are associated with a plurality of domains including at least a first domain for a first application which opens and presents a first group of objects in the first domain and a second domain for a second application which opens=and presents a second group of objects in the second domain, wherein the first search result stream is generated by searching within the first domain comprising the first group of objects using a first database that stores at least one of content and metadata about the first group of objects and the second search result stream is generated by searching within the second domain comprising the second group of objects using a second database that stores at least one of content and metadata about the second group of objects and that is independent from the first database;
    a search application configured to display a search result from the primary search result stream corresponding to search results from both the first domain and the second domain, and
    a table configured to associate the first application with the first domain and to associate the second application with the second domain, wherein the search application is configured to query the table to identify the first application based on the domain from which the search result is generated, and in response to receiving a request to open an object referenced by the search result, the search application configured to invoke the first application to open the object and identify the object to the first application by using an identifier that is unique among a plurality of identifiers identifying objects within the first domain but is not configured to be unique among identifiers for the plurality of domains.

2. The apparatus of claim 1, further comprising a software component associated with one of the first domain and the second domain, wherein the software component is configured to provide one domain-specific search result stream of the plurality of domain-specific search result streams to the search daemon.

3. The apparatus of claim 2, wherein the software component is further configured to search one of the first database and the second database to generate the domain-specific search result stream.

4. The apparatus of claim 2, wherein the software component performs a content search by searching an index in one of the first database and the second database.

5. The apparatus of claim 4, wherein the index is an inverted index.

6. The apparatus of claim 5, further comprising an indexing service coupled to the at least one of the first database and the second database, the indexing service configured to, in response to receiving the indication that the search has been initiated, update the index if the index is outdated.

7. The apparatus of claim 2, wherein the software component is configured to perform search of the metadata in one of the first database and second database.

8. The apparatus of claim 1, wherein the identifier is a row identifier of a row in one of the first database and the second database associated with the search result.

9. The apparatus of claim 8, wherein the identifier is a uniform resource locator (URL).

10. A computer-implemented method, comprising:
receiving an indication that a search has been initiated;
in response to the indication, searching a plurality of domains including a first domain for a first application which opens and presents a first group of objects in the first domain and a second domain for a second application which opens and presents a second group of objects in the second domain to generate a first domain-specific search result stream and a second domain-specific search result stream, wherein the first domain-specific search result stream is generated by searching within the first domain which comprises the first group of objects using a first database that stores at least one of content and metadata about the first group of objects and the second search result stream is generated by searching within the second domain which comprises the second group of objects using a second database that stores at least one of content and metadata about the second group of objects and that is independent from the first database;
aggregating a plurality of domain specific search result streams including the first domain-specific search result stream and the second domain-specific search result stream into a primary search result stream;
displaying a search result from the primary search result stream corresponding to search results from both the first domain and the second domain; and
in response to receiving a request to open an object referenced by the search result, identifying one of the first or the second application based on the domain, in the plurality of domains, of the object referenced by the search result, wherein the first or the second application is identified by querying a data structure configured to associate at least one of the application or the object with one of the first domain and the second domain; and in response to receiving the request to open the object, identifying the object to the identified application by using an identifier that is unique among a plurality of identifiers that identify objects within the domain of the identified application, wherein at least one of the receiving, searching, aggregating, displaying, and identifying is performed by a processing system.

11. The computer-implemented method of claim 10, wherein searching the domains comprises performing a content search using at least one of the first database and the second database.

12. The computer-implemented method of claim 11, wherein the content search is performed by searching the index in the at least one of the first database and the second database.

13. The computer-implemented method of claim 12, wherein the index is An inverted index.

14. The computer-implemented method of claim 12, further comprising:
in response to receiving an indication that a search has been initiated, determining whether the index is outdated, and updating the index if the index is outdated.

15. The computer-implemented method of claim 11, further comprising, in response to receiving an indication that a search has been initiated, creating the index in response to determining that the index does not exist.

16. The computer-implemented method of claim 10, wherein searching the domains comprises performing a search of the metadata in at least one of the first database and the second database.

17. The computer-implemented method of claim 10 wherein the data structure is a table.

18. The computer-implemented method of claim 10, wherein the identifier is a row identifier of a row in the at least one of the first database and the second database associated with the search result.

19. The computer-implemented method of claim 10, wherein the identifier is a uniform resource locator (URL).

20. The computer-implemented method of claim 10, wherein the identifier is not configured to be unique among identifiers for other one of the first domain and the second domain.

21. A computer readable non-transitory storage medium providing instructions executable by a computer to configure the computer to perform a method comprising:
receiving an indication that a search has been initiated;
in response to the indication, searching a plurality of domains including a first domain for a first application which opens and presents a first group of objects in the first domain and a second domain for a second application which opens and presents a second group of objects in the second domain a to generate a first domain-specific search result stream and a second domain-specific search result stream, wherein the first domain-specific search result stream is generated by searching within the first domain which comprises the first group of objects using a first database that stores at least one of content and metadata about the first group of objects and the second search result stream is generated by searching within the second domain which comprises the second group of objects using a second database that stores at least one of content and metadata and that is independent from the first database;
aggregating a plurality of domain-specific search result streams, including the first domain-specific search result stream and the second domain-specific search result stream, into a primary search result stream;
displaying a search result from the primary search result stream corresponding to search results from both the first domain and the second domain; and
in response to receiving a request to open an object referenced by the search result, identifying one of the first or the second application based on the domain, in the plurality of domains, of the object referenced by the search result, wherein the first or the second application is identified by querying a data structure configured to associate at least one of the application or the object with one of the first domain and the second domain; and
in response to receiving the request to open the object, identifying the object to the identified application by using an identifier that is unique among a plurality of identifiers that identify objects within the domain of the identified application.

22. The computer readable non-transitory storage medium of claim 21, wherein searching the domains comprises performing a content search using at least one of the first database and the second database.

23. The computer readable non-transitory storage medium of claim 22, wherein the content search is performed by searching the index in the at least one of the first database and the second database.

24. The computer readable non-transitory storage medium of claim 23, wherein the machine-readable medium further provides instructions executable by the computer to configure the computer to perform a method comprising:
in response to receiving an indication that a search has been initiated, determining whether the index is outdated, and updating the index if the index is outdated.

25. The computer readable non-transitory storage medium of claim 22, further providing instructions executable by the computer to configure the computer to perform a method comprising creating the index in response to receiving an indication that a search has been initiated and determining that the index does not exist.

26. The computer readable non-transitory storage medium of claim 21, wherein searching the domains comprises performing a search of the metadata in at least one of the first database and the second database.

27. The computer readable non-transitory storage medium of claim 21, further providing instructions executable by the computer to configure the computer to pass the identifier to the application, wherein the identifier references the object.

28. A computer-implemented method, comprising:
receiving an indication that a search has been initiated, in response to the receiving, aggregating a plurality of domain-specific search result streams including a first search result stream and a second search result stream to generate a primary search result stream, wherein the first search result stream is generated by searching within a first domain comprising a first group of objects using a first database that stores at least one of content and metadata about the first group of objects and the second search result stream is generated by searching within a second domain comprising a second group of objects using a second database that stores at least one of content and metadata about the second group of objects and that is independent from the first database, and wherein the first domain is associated with a first application which opens and presents the first group of objects in the first domain and the second domain is associated with a second application which opens and presents the second group of objects in the second domain, wherein the primary search result stream corresponds to search results from both the first domain and the second domain;

in response to receiving a request to open an object referenced by a search result, identifying one of the first or the second application based on the domain, in the plurality of domains, of the object referenced by the search result, wherein the first or the second application is identified by querying a data structure configured to associate at least one of the application or the object with one of the first domain and the second domain; and in response to receiving the request to open the object, identifying the object to the identified application by using an identifier that is unique among a plurality of identifiers that identify objects within the domain of the identified application, and
wherein at least one of the receiving, searching, aggregating, and identifying is performed by a processing system.

29. An apparatus, comprising:
means for receiving an indication that a search has been initiated,
means for in response to the receiving, aggregating a plurality of domain-specific search result streams including a first search result stream and a second search result stream to generate a primary search result stream, wherein the first search result stream is generated by searching within a first domain comprising a first group of objects using a first database that stores at least one of content and metadata about the first group of objects and the second search result stream is generated by searching within a second domain comprising a second group of objects using a second database that stores at least one of content and metadata about the second group of objects and that is independent from the first database, and wherein the first domain is associated with a first application which opens and presents the first group of objects in the first domain and the second domain is associated with a second application which opens and presents the second group of objects in the second domain, wherein the primary search result stream corresponds to search results from both the first domain and the second domain;

means for in response to receiving a request to open an object referenced by a search result, identifying one of the first or the second application based on the domain, in the plurality of domains, of the object referenced by the search result, wherein the first or the second application is identified by querying a data structure configured to associate at least one of the application or the object with one of the first domain and the second domain; and in response to receiving the request to open the object, identifying the object to the identified application by using an identifier that is unique among a plurality of identifiers that identify objects within the domain of the identified application, and wherein at least one of the means for receiving, means for searching, means for aggregating, and means for identifying includes a processing system.

* * * * *